US004001713B2

United States Statutory Invention Registration [19]

[11] Reg. Number: H1713

Pearlman et al.

[45] Published: Mar. 3, 1998

[54] REMOTE ALARM FOR PERSONAL INTELLIGENT COMMUNICATORS

[75] Inventors: Ted Louis Pearlman, Montclair; Andrew Todd Zidel, Hawthorne, both of N.J.

[73] Assignees: Sony Corporation, Tokyo, Japan; Sony Electronics, Inc., Park Ridge, N.J.

[21] Appl. No.: 574,623

[22] Filed: Dec. 19, 1995

[51] Int. Cl.[6] ..... H04Q 7/08

[52] U.S. Cl. ..... 340/311.1; 340/531; 340/539; 340/573; 340/825.44; 340/825.45

[58] Field of Search ..... 340/311.1, 407.1, 340/531, 539, 566, 573, 692, 691, 825.44, 825.45, 825.46; 379/52, 56, 57, 58

[56] References Cited

U.S. PATENT DOCUMENTS

| | | | |
|---|---|---|---|
| 4,297,677 | 10/1981 | Lewis et al. | 340/566 |
| 4,421,953 | 12/1983 | Zielinski | 340/825.46 |
| 4,777,474 | 10/1988 | Clayton | 340/539 |
| 4,853,674 | 8/1989 | Kiss | 340/407.1 |
| 5,363,089 | 11/1994 | Goldenberg | 340/825.44 |

*Primary Examiner*—Bernarr E. Gregory
*Attorney, Agent, or Firm*—Blakely, Sokoloff, Taylor & Zafman LLP

[57] ABSTRACT

A remote alarm apparatus is described. A transmitter is communicatively coupled to a primary communications device. The transmitter broadcasts a notification signal in response to a primary communications device alert. The notification signal is a phase modulated, radio frequency signal. A remote alarm indicator provides remote notification of the primary communications device alert. The remote alarm indicator includes a radio frequency receiver for receiving the notification signal, an alarm indicator, a decoder, a battery, and a switch. The decoder provides a signal to the alarm indicator corresponding to whether the notification signal has been received by the radio frequency receiver. The switch is coupled to permit deactivation of the alarm indicator. The battery provides power to the radio frequency receiver, the alarm indicator, and the decoder.

14 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOTE ALARM FOR PERSONAL INTELLIGENT COMMUNICATORS

FIELD OF THE INVENTION

This invention relates to the field of personal communications devices.

BACKGROUND OF THE INVENTION

Advances in manufacturing and electronics technologies have permitted a reduction in the size of electronic communications devices. Some products have been able to be reduced to the point that they have become portable and can easily be transported or carried about on the person. Primary communication devices such as pagers, laptop computers, and cellular telephones are examples of such devices.

These primary communication devices typically require that the user be within earshot of a audible tone that notifies the user of incoming messages or an event. For example, the user must be able to hear an audible ringer tone for the typical cellular telephone.

Although many communication devices are readily transported, they may have limitations which makes continuous carrying about on the person somewhat undesirable. For example, laptop computers are limited in their reducibility because they must provide a keyboard and a display screen. In addition, batteries for laptops typically permit only a few hours of usage before they have to be replaced.

The inability to operate for more than a few hours without a recharge is a limitation for cellular telephones as well. Although the cellular telephone may be carried about the person, usage is typically limited to a few hours before the batteries must be recharged. Thus the cellular telephone in reality cannot be located very far away from a recharging device for an extended period of time. This recharging device may not be located such that the user is within earshot of the cellular telephone's audible incoming call alert.

Desktop computers are often used for transmitting and receiving electronic mail messages. Typically the user will receive notification that he has received an incoming mail message even while working with another software application. This notification might be in the form of an audible alert or some visual alert appearing on the computer's display. If, however, the user steps away from his desk or out of the office—he may not be within earshot of the audible alert and will not be within visual range of the visual alert. Thus the user risks not receiving timely notification that electronic mail message has been received anytime the user leaves the office.

Another form of electronic communication on a personal computer allows one user to contact the other user for more of a "real time" message. Instead of ending a communication session upon the transmission of a mail message, this form of electronic communication allows the session to remain active so that both users may transmit information back in forth. This information might even contain images of the individuals so that they can see each other while communicating with each other.

Due to limitations such as size or battery charge, the primary communications device may not be located within earshot or notification range of the user. FIG. 1 illustrates the geographic limitations of the primary communications devices in a typical office environment. While the intended addressee 100 is in conference room 150, the addressee cannot be alerted to incoming or attempted communications on the cellular telephone 110, the personal communicator

120, or the desktop computer 130 because of their geographic location and the geographic limitations in their alert mechanisms. This may result in lost messages or missed communications. Alternatively, because a user is at risk of missing notification of a communication, the user may not have the freedom to wander more than a short distance from the primary communication device.

Although technical disadvantages have been presented with respect to carrying around primary communications devices, social issues exist as well. Carrying a laptop computer or cellular telephone about visibly on the person may subject the carrier to greater risk of harm due to attempted theft. A social status might be inferred by visibly carrying a laptop computer or a cellular telephone. This in turn might subject the carrier to positive or negative treatment by otherwise indifferent individuals. Avoiding negative treatment would require hiding the communications device from open view, an objective that may not be easily accomplished for some primary communications devices such as cellular telephones and laptop computers.

What is needed is a discrete wireless secondary communications device to notify the user that communications activity is occurring or being attempted on the primary communications device.

SUMMARY AND OBJECTS OF THE INVENTION

In view of limitations of known systems and methods, one of the objectives of the present invention is to provide a discrete wireless remote alarm apparatus. A transmitter is communicatively coupled to a primary communications device. The transmitter broadcasts a notification signal in response to a primary communications device alert. The notification signal is a phase modulated, radio frequency signal. A remote alarm indicator provides remote notification of the primary communications device alert. The remote alarm indicator includes a radio frequency receiver for receiving the notification signal, an alarm indicator, a decoder, a battery, and a switch. The decoder provides a signal to the alarm indicator corresponding to whether the notification signal has been received by the radio frequency receiver. The switch is coupled to permit deactivation of the alarm indicator. The battery provides power to the radio frequency receiver, the alarm indicator, and the decoder.

Another objective is to provide a discrete wireless multiple remote alarm apparatus. The multiple remote alarm includes a plurality of transmitters. Each transmitter is communicatively coupled to an associated primary communications device. Each transmitter broadcasts a notification signal in response to its associated primary communications device alert. The notification signals are phase modulated, radio frequency signals. A remote alarm indicator provides remote notification of the primary communications device alerts. The remote alarm indicator includes a radio frequency receiver for receiving the notification signals, an alarm indicator, a decoder, a battery, and a switch. The decoder provides a signal to the alarm indicator corresponding to whether any notification signals have been received by the radio frequency receiver. The switch is coupled to permit deactivation of the alarm indicator. The battery provides power to the radio frequency receiver, the alarm indicator, and the decoder.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Primary communications devices can be further subdivided into originating and answering devices. An originating device is the device that initiates or attempts to initiate contact with the answering device. For example, telephones are primary communications devices. A telephone can operate as either an originating device or an answering device. A telephone line associated with one or more phones at a particular geographic location is assigned a number or a range of telephone numbers. When that telephone number or a telephone number within the range of telephone numbers is dialed from an originating device, the telephone(s) coupled to the telephone line corresponding to that telephone number will ring or otherwise indicate that communication is being attempted. The device originating the call and the telephone that answers or rings in response to that call are primary communications devices.

Another example of a primary communications device is the Sony Magic Link Personal Intelligent Communicator™. The Sony Magic Link Personal Intelligent Communicator™ (Sony PIC) is a product of Sony Electronics, Inc. of Park Ridge, N.J. One function of the Sony PIC is that it permits two-way wireless and wireline communications with other primary communications devices including communication with other Sony PICs.

A secondary communications device is not a primary communications device. Although a secondary communications device can initiate contact with another communications device, the secondary communications device does so only in response to activity on an associated primary communications device.

Figure 1:
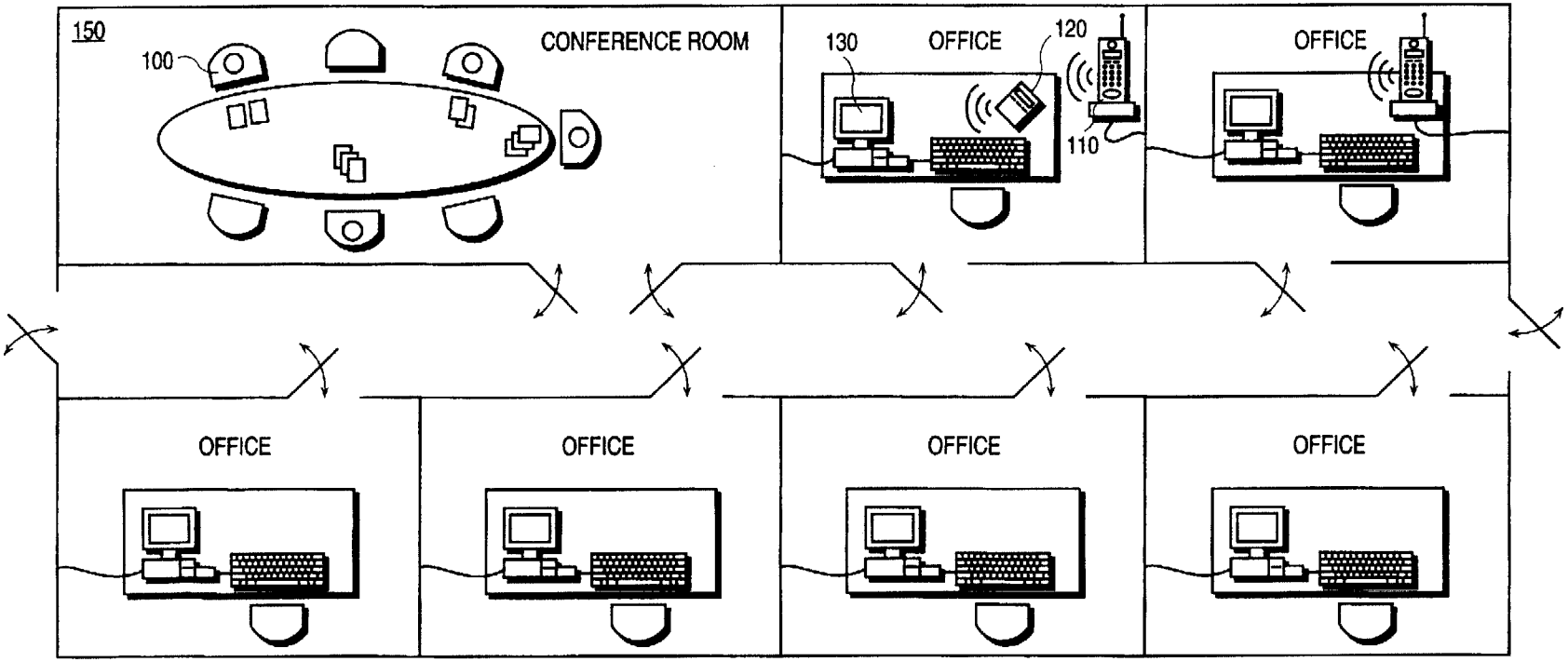
FIG. 1 illustrates geographic limitations of primary communication devices in an office environment.
Figure 2:
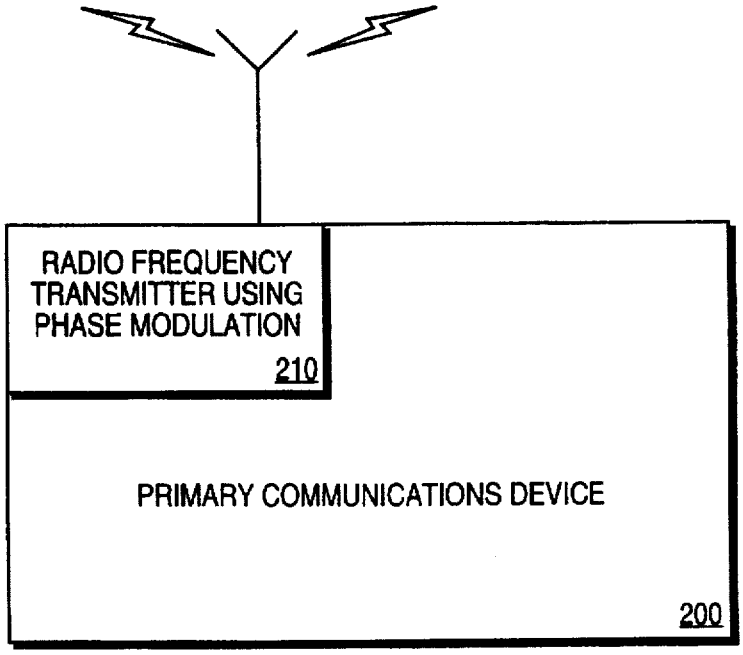
FIG. 2 illustrates placement of a remote alarm transmitter.

A wireless secondary communications device or remote alarm is dependent upon a transmitter located either near the primary communications device or incorporated within the primary communications device. FIG. 2 illustrates an embodiment of a remote alarm transmitter (210) incorporated into primary communications device 200. In this embodiment the transmitter transmits at radio frequencies. Preferably the transmitter uses a band of frequencies that does not require licensing under Federal Communications Commission regulations. In particular, frequencies in the range of 902–928 Mhz (the Industrial, Scientific and Medical or ISM Band) are used. The preferred channel width for the remote alarm transmitter when operating in the ISM band is approximately 12.5 kHz.

Preferably, the transmitter utilizes phase modulation to transmit a notification signal to a remote alarm indicator. Because the remote alarm indicator is a secondary communications device, it is triggered only in response to activity by the primary answering communications device and normally operates in a standby/listening mode.

Figure 3:
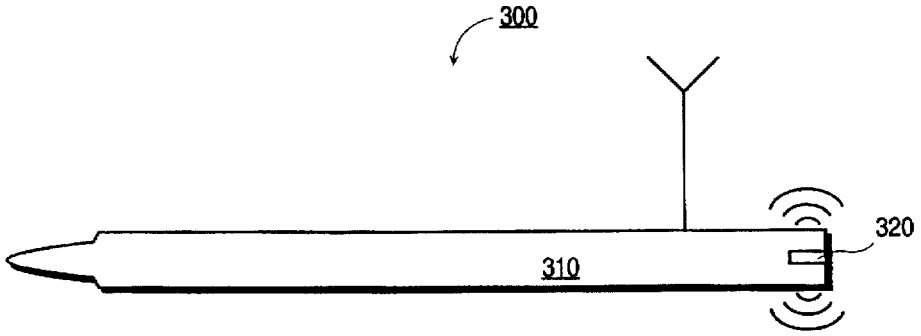
FIG. 3 illustrates one embodiment of a form factor for the remote alarm indicator.

The form factor for the remote alarm indicator is designed for ease of carrying. Because the remote alarm is a notification device only, it requires less power than the transmitter and can be built into a smaller form factor. This permits incorporating the remote alarm indicator into a discrete form factor. FIG. 3 illustrates one embodiment of the remote alarm indicator. In particular, the remote alarm indicator is built into a pen-shaped form factor 300. The body of the pen might serve as an antenna 310 for receiving notification signals transmitted by the aforementioned transmitter. Visual notification that communication is being attempted with the primary communications device is provided by a light source such as light emitting diode 320.

Figure 4:
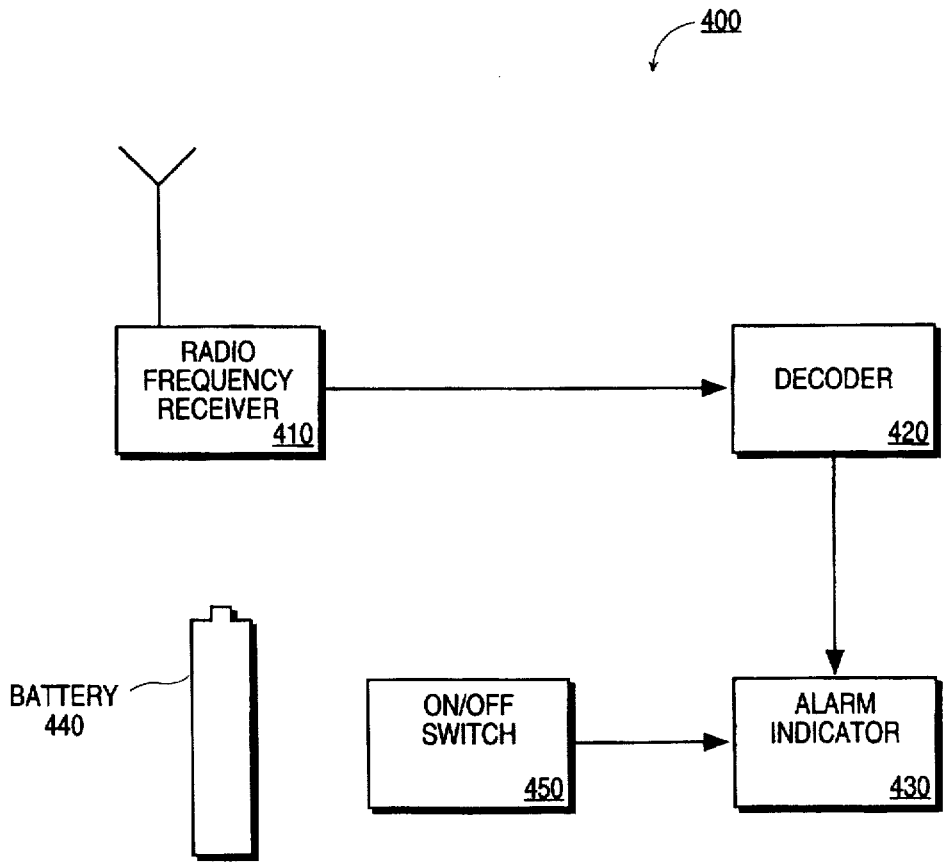
FIG. 4 illustrates circuitry for the remote alarm indicator in block diagram form.

FIG. 4 illustrates in block diagram form the remote alarm indicator circuitry 400. Radio frequency receiver 410 is required for receiving signals transmitted by the phase modulated transmitter illustrated in FIG. 2. Receiver 410 is coupled to decoder 420. Decoder 420 determines from the received signals provided by receiver 410 whether a notification signal has been received. Decoder 420 provides a signal to alarm indicator 430 corresponding to the receipt or non-receipt of the notification signal. In one embodiment, the alarm indicator provides an audible signal responsive to the signal provided by decoder 420. In an alternative embodiment, alarm indicator 430 provides a visual notification in responsive to the signal provided by decoder 420.

Battery 440 is included in the block diagram as a reminder that electrical power is to be provided by a battery for ease of portability. Various embodiments use "AAA-type" or "N -type" or smaller batteries in order to ensure a small form factor. Although electrical couplings are not explicitly illustrated in FIG. 4, battery 440 provides the electrical power required to operate receiver 410, decoder 420, and alarm indicator 430.

On/off switch 450 is provided to permit turning off the alarm indicator. The switch could be used when the remote alarm indicator is not needed in order to conserve battery power. Alternatively, the on/off switch might be used to turn off the alarm indicator—a feature that could prove particularly useful when an audible notification signal is used. The on/off switch could be designed to operate much as the "pushbutton" top of a retractable ball point pen in order to avoid drawing attention to the remote alarm indicator as anything other than an ordinary pen.

An alternative embodiment of the remote alarm would provide an indicator for more than one primary communications device. For example, the user would be notified if any of the user's primary communications devices were issuing an alert. Thus using a single remote alarm, the user could be notified of a pager alert or a ringing cellular telephone, or the receipt of an electronic mail message. Such a device might be referred to as a multiple alert remote alarm.

An alternative embodiment of the multiple alert remote alarm is that the remote alarm indicates which of the user's primary communications devices is signaling an alert. This might be indicated by a flashing sequence that is unique to each primary communication device in case a visual alarm is used. If an audible alert is used, the user might be notified specifically which device signaling an alert by a sound or a tone that is unique to each primary communication device. In one embodiment, this sound is a digitized speech message. Low cost circuitry for generating digitized speech is readily available.

Another example of a primary communications device that would benefit from a remote alarm is a baby monitor. Baby monitors typically allow a guardian to listen to activity occurring near an infant from a remote location. The remote receiver, however, may not be an easily portable device. Often, the parent or guardian only needs to be aware that some level of activity (indicated directly by a level of sound created by the infant from activities such as snoring or crying) is occurring. The transmitter for the remote alarm can be set to alert the remote alarm in the event that the sound level exceeds a certain threshold. This permits the guardian the freedom to travel a greater distance from the baby monitor and yet provides the ability to notify the guardian immediately if the infant is crying, for example.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A discrete wireless remote alarm apparatus comprising:

a transmitter communicatively coupled to a primary communications device, wherein the transmitter broadcasts a notification signal in response to receipt of e-mail by the primary communications device, wherein the notification signal is a phase modulated, radio frequency signal;

a remote alarm indicator for remote notification of the primary communications device alert, comprising:

a radio frequency receiver for receiving the notification signal;

an alarm indicator;

a decoder coupled to the receiver and the alarm indicator, wherein the decoder provides a signal to the alarm indicator corresponding to whether the notification signal has been received;

a battery coupled to provide power to the radio frequency receiver, the alarm indicator, and the decoder; and a switch coupled to the alarm indicator to permit deactivating the alarm indicator.

2. The discrete wireless remote alarm apparatus of claim 1 wherein the alarm indicator is a visual indicator.

3. The discrete wireless remote alarm apparatus of claim 1 wherein the alarm indicator is an audible indicator.

4. The discrete wireless remote alarm apparatus of claim 1 wherein the remote alarm indicator has the form factor of a pen.

5. The discrete wireless remote alarm apparatus of claim 4 wherein a body of the pen is an antenna for the radio frequency receiver.

6. The discrete wireless remote alarm apparatus of claim 1 wherein the transmitter and radio frequency receiver operate within a range of 902 MHz to 928 MHz.

7. A discrete wireless remote alarm apparatus comprising:

a plurality of transmitters, each communicatively coupled to an associated primary communications device, wherein each transmitter broadcasts a notification signal in response to its associated primary communications device alert, wherein at least one notification signal indicates the receipt of e-mail by its associated primary communications device, wherein the notification signals are phase modulated, radio frequency signals;

a remote alarm indicator for remote notification of the primary communications device alerts, comprising:

a radio frequency receiver for receiving the notification signals;

an alarm indicator;

a decoder coupled to the receiver and the alarm indicator, wherein the decoder provides a signal to the alarm indicator corresponding to whether any notification signals have been received;

a battery coupled to provide power to the radio frequency receiver, the alarm indicator, and the decoder; and a switch coupled to the alarm indicator to permit deactivating the alarm indicator.

8. The discrete wireless remote alarm apparatus of claim 7 wherein the signal provided by the decoder varies in response to an identity of the primary communications device associated with the primary communications device alert, wherein the alarm indicator provides varying alarm indications in response to the signal provided by the decoder.

9. The discrete wireless remote alarm apparatus of claim 8 wherein the alarm indicator is a visual indicator.

10. The discrete wireless remote alarm apparatus of claim 9 wherein the alarm indicator is a flashing sequence, wherein the flashing sequence is unique for each primary communications device.

11. The discrete wireless remote alarm apparatus of claim 8 wherein the alarm indicator is an audible indicator.

12. The discrete, wireless remote alarm apparatus of claim 8 wherein the remote alarm indicator has the form factor of a pen.

13. The discrete wireless remote alarm apparatus of claim 12 wherein a body of the pen is an antenna for the radio frequency receiver.

14. The discrete wireless remote alarm apparatus of claim 7 wherein the transmitter and radio frequency receiver operate within a range of 902 MHz to 928 MHz.

* * * * *